(12) United States Patent
Tsuji et al.

(10) Patent No.: US 10,844,196 B2
(45) Date of Patent: Nov. 24, 2020

(54) THERMALLY-CONDUCTIVE SILICONE COMPOSITION

(71) Applicant: Shin-Etsu Chemical Co., Ltd., Tokyo (JP)

(72) Inventors: Kenichi Tsuji, Annaka (JP); Nobu Kato, Annaka (JP); Munenao Hirokami, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 28 days.

(21) Appl. No.: 16/345,041

(22) PCT Filed: Oct. 13, 2017

(86) PCT No.: PCT/JP2017/037176
§ 371 (c)(1),
(2) Date: Apr. 25, 2019

(87) PCT Pub. No.: WO2018/079309
PCT Pub. Date: May 3, 2018

(65) Prior Publication Data
US 2019/0309206 A1 Oct. 10, 2019

(30) Foreign Application Priority Data

Oct. 26, 2016 (JP) .................. 2016-209285

(51) Int. Cl.
| | | |
|---|---|---|
| *C08K 5/3475* | (2006.01) | |
| *C08L 83/04* | (2006.01) | |
| *C08K 3/00* | (2018.01) | |
| *C08L 83/06* | (2006.01) | |
| *C08K 3/22* | (2006.01) | |

(52) U.S. Cl.
CPC .............. *C08K 5/3475* (2013.01); *C08K 3/00* (2013.01); *C08L 83/04* (2013.01); *C08L 83/06* (2013.01); *C08K 2003/2227* (2013.01); *C08K 2003/2296* (2013.01); *C08K 2201/001* (2013.01); *C08L 2203/20* (2013.01); *C08L 2205/025* (2013.01)

(58) Field of Classification Search
CPC combination set(s) only.
See application file for complete search history.

(56) References Cited

U.S. PATENT DOCUMENTS

| | | | |
|---|---|---|---|
| 2015/0148273 A1* | 5/2015 | Matsumoto | C08K 3/36 508/139 |
| 2015/0218417 A1 | 8/2015 | Miyamoto et al. | |
| 2018/0134871 A1* | 5/2018 | Kato | C08L 83/04 |
| 2019/0092944 A1 | 3/2019 | Mizushima et al. | |

FOREIGN PATENT DOCUMENTS

| | | |
|---|---|---|
| JP | 2938428 B1 | 8/1999 |
| JP | 2938429 B1 | 8/1999 |
| JP | 2004-168920 A | 6/2004 |
| JP | 3952184 B2 | 8/2007 |
| JP | 2014-51606 A | 3/2014 |
| WO | WO 2004/046233 A1 | 6/2004 |
| WO | WO 2016/199742 A1 | 12/2016 |
| WO | WO 2017/159047 A1 | 9/2017 |

OTHER PUBLICATIONS

International Search Report (PCT/ISA/210) issued in PCT/JP2017/037176, dated Dec. 12, 2017.

(Continued)

*Primary Examiner* — Marc S Zimmer
(74) *Attorney, Agent, or Firm* — Birch, Stewart, Kolasch & Birch, LLP

(57) ABSTRACT

This thermally-conductive silicone composition comprises:
(A) an organopolysiloxane having two or more alkenyl groups per molecule, and having a kinetic viscosity of 10-100,000 mm²/s at 25° C.,
(B) a hydrolyzable methyl polysiloxane which is represented by formula (1)

$$CH_3(SiO_a Si(OR^1)_3 \text{ with } CH_3 \text{ groups}) \quad (1)$$

($R^1$ represents an alkyl group, and a is 5-100) and of which one end is trifunctional,
(C) a thermally-conductive filler having a thermal conductivity of 10 W/m·° C. or more,
(D) an organohydrogen polysiloxane having two or more Si—H groups per molecule,
(E) a catalyst selected from the group consisting of platinum and platinum compounds, and
(F) a benzotriazole derivative represented by formula (2)

$$\text{(benzotriazole structure with } R^2 \text{ substituents and } N\text{-}C(O)R^3\text{)} \quad (2)$$

($R^2$ represents H or a monovalent hydrocarbon group, and $R^3$ represents a monovalent organic group). The composition can inhibit the decrease of the curing speed. A cured product of the composition has a small hardness increase when being aged at a high temperature, and has a small heat resistance increase after undergoing a heat cycle test.

3 Claims, No Drawings

(56) References Cited

OTHER PUBLICATIONS

Written Opinion (PCT/ISA/237) issued in PCT/JP2017/037176, dated Dec. 12, 2017.

* cited by examiner

THERMALLY-CONDUCTIVE SILICONE COMPOSITION

TECHNICAL FIELD

This invention relates to a heat-conductive silicone composition which eliminates a drop of initial cure speed and experiences a minimal increase of cured hardness even after long-term exposure to high temperature.

BACKGROUND ART

As is well known, electronic components such as LSIs and IC chips generate heat during operation and concomitantly degrade their performance. To overcome this problem, various heat dissipation techniques are used. For example, it is known that heat dissipation from a heat-generating portion is effectively achieved by disposing a cooling member such as a heatsink in the vicinity of the heat-generating portion, bringing them into close contact to facilitate efficient heat transfer to the cooling member, and cooling the cooling member. If there is a gap between the heat-generating member and the cooling member, low heat-conductive air intervenes therebetween to prohibit efficient heat transfer, failing to fully reduce the temperature of the heat-generating member. For the purpose of preventing air from intervening between the heat-generating member and the cooling member to avoid such a phenomenon, heat-dissipating materials, sheets, and grease which have a high thermal conductivity and are conformable to the surface of the members are used (Patent Documents 1 to 3: JP 2938428, JP 2938429, and JP 3952184). Among these, the thermal grease exerts good performance in terms of thermal resistance because it can be used in reduced thickness on packaging.

There is a thermal grease of the type which is used by sandwiching it between members and then heat curing. Since the heat cured thermal grease is further heated during operation of devices, the grease may increase its hardness during service. As the hardness increases, the grease loses flexibility, leaving a concern that the grease cannot conform to "bow" or warp during operation. After the failure to conform to bow, voids are created between the member and the thermal grease, detracting from heat dissipating properties.

On the other hand, it is known that the compression set of silicone rubber is reduced by incorporating a benzotriazole compound therein. From the reduction of compression set, it is expectable that any hardness increase during high-temperature aging is suppressed. The incorporation of a triazole compound, however, gives rise to the problem that the cure speed on heating decelerates. If the cure speed of thermal grease decreases, there arises the problem that a minute volume of gas is generated before the grease has cured, the gas expands on heating, and voids are formed in the subsequently cured material, detracting from heat dissipation capability.

PRIOR ART DOCUMENTS

Patent Documents

Patent Document 1: JP 2938428

Patent Document 2: JP 2938429

Patent Document 3: JP 3952184

SUMMARY OF INVENTION

Technical Problem

An object of the present invention, which has been made under the above circumstances, is to provide a heat-conductive silicone composition which is reduced in hardness increase during high-temperature aging, reduced in thermal resistance increase after a thermal cycling test, and suppressed in cure speed deceleration.

Solution to Problem

Making extensive investigations to attain the above object, the inventors have found that a heat-conductive silicone composition comprising:

(A) an organopolysiloxane containing at least two alkenyl groups in a molecule and having a kinematic viscosity of 10 to 100,000 $mm^2/s$ at 25° C., (B) a one end trifunctional, hydrolyzable methylpolysiloxane having the general formula (1):

[Chem. 1]

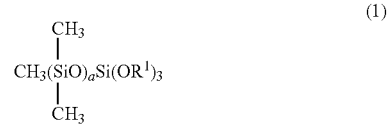

wherein $R^1$ is a $C_1$-$C_6$ alkyl group and a is a positive number of 5 to 100, (C) a heat-conductive filler having a thermal conductivity of at least 10 W/m·° C., (D) an organohydrogenpolysiloxane containing at least two silicon-bonded hydrogen atoms in a molecule, (E) a catalyst selected from the group consisting of platinum and platinum compounds, and (F) a benzotriazole derivative having the general formula (2):

[Chem. 2]

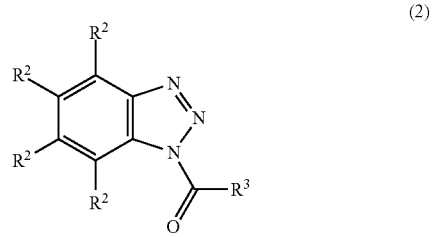

wherein $R^2$ is hydrogen or a $C_1$-$C_6$ monovalent hydrocarbon group and $R^3$ is a monovalent organic group, in a specific proportion eliminates a drop of initial cure speed, experiences a minimal increase of cured hardness even after long-term exposure to high temperature of the order of 80 to 150° C., and is reduced in thermal resistance increase after a thermal cycling test. The invention is predicated on this finding.

Accordingly, the present invention provides a heat-conductive silicone composition as defined below.

[1]

A heat-conductive silicone composition comprising:

(A) an organopolysiloxane containing at least two alkenyl groups in a molecule and having a kinematic viscosity of 10 to 100,000 mm²/s at 25° C., (B) a hydrolyzable methylpolysiloxane which is trifunctional at one end, having the general formula (1):

[Chem. 3]

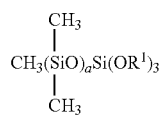

(1)

wherein $R^1$ is a $C_1$-$C_6$ alkyl group and a is a positive number of 5 to 100, in an amount of 10 to 150 parts by weight per 100 parts by weight of component (A), (C) a heat-conductive filler having a thermal conductivity of at least 10 W/m·° C., in an amount of 500 to 3,000 parts by weight per 100 parts by weight of components (A) and (B) combined, (D) an organohydrogenpolysiloxane containing at least two silicon-bonded hydrogen atoms in a molecule, in such an amount that [the number of Si—H groups in component (D)]/[the number of alkenyl groups in component (A)] ranges from 0.5 to 1.5, (E) a catalyst selected from the group consisting of platinum and platinum compounds, in such an amount as to provide 0.1 to 500 ppm of platinum atom based on the weight of component (A), and (F) a benzotriazole derivative having the general formula (2):

[Chem. 4]

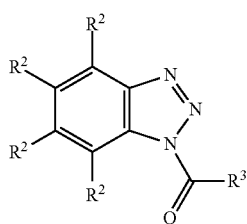

(2)

wherein $R^2$ is hydrogen or a $C_1$-$C_6$ monovalent hydrocarbon group and $R^3$ is a monovalent organic group, in an amount of 2 to 1,000 moles per mole of platinum atom in component (E).

[2]

The heat-conductive silicone composition of [1], further comprising (G) an inhibitor selected from the group consisting of acetylene compounds, nitrogen compounds, organophosphorus compounds, oxime compounds, and organic chlorine compounds, in an amount of 0.1 to 5% by weight based on component (A).

[3]

The heat-conductive silicone composition of [1] or [2] wherein $R^3$ in formula (2) is a $C_1$-$C_{10}$ monovalent hydrocarbon group or a group having the following formula:

[Chem. 5]

wherein $R^4$ is a $C_1$-$C_{15}$ monovalent hydrocarbon group or —$(CH_2)_b$—Si(OR$^5$)$_3$ wherein $R^5$ is a $C_1$-$C_4$ alkyl group or a group SiR$^6_3$ wherein $R^6$ is a $C_1$-$C_4$ alkyl group, b is an integer of 1 to 6, and * designates a valence bond.

Advantageous Effects of Invention

The heat-conductive silicone composition of the invention having an appropriate amount of a benzotriazole derivative of specific structure incorporated therein is effective for suppressing any hardness increase of a cured composition during high-temperature aging and minimizing a lowering of cure speed.

DESCRIPTION OF EMBODIMENTS

Component (A) used herein is an organopolysiloxane having at least two, preferably 2 to 10, more preferably 2 to 5 silicon-bonded alkenyl groups in a molecule, which may be linear or branched. It may be a mixture of two or more organopolysiloxanes having different viscosities.

Exemplary alkenyl groups include those of 2 to 6 carbon atoms such as vinyl, allyl, 1-butenyl, and 1-hexenyl. Of these, vinyl is preferred for ease of synthesis and cost.

The remaining silicon-bonded organic groups are preferably substituted or unsubstituted $C_1$-$C_{12}$, more preferably $C_1$-$C_6$, aliphatic unsaturation-free, monovalent hydrocarbon groups. Specific examples include alkyl groups such as methyl, ethyl, propyl, butyl, hexyl, dodecyl, aryl groups such as phenyl, and aralkyl groups such as 2-phenylethyl and 2-phenylpropyl. Also included are halo-substituted hydrocarbon groups such as chloromethyl and 3,3,3-trifluoropropyl. Of these, methyl is preferred for ease of synthesis and cost.

The silicon-bonded alkenyl group may be present at the end or in the middle of the molecular chain of the organopolysiloxane, and preferably attached at least to the end of the molecular chain.

Component (A) has a kinematic viscosity at 25° C. in the range of 10 to 100,000 mm²/s, preferably 100 to 50,000 mm²/s as measured by an Ostwald viscometer. If the kinematic viscosity is less than 10 mm²/s, the composition shows noticeable oil bleeding and loses reliability. If the viscosity exceeds 100,000 mm²/s, the composition shows a viscosity buildup and becomes less extensible.

Examples of component (A) include, but are not limited to, molecular both end dimethylvinylsiloxy-blocked dimethylpolysiloxane, dimethylpolysiloxane/methylvinylpolysiloxane copolymers blocked at one end of the molecular chain with dimethylvinylsiloxy and at the other end with trimethylsiloxy, molecular both end trimethylsiloxy-blocked dimethylsiloxane/methylvinylsiloxane copolymers, molecular both end trimethylsiloxy-blocked methylvinylpolysiloxane, and molecular both end dimethylvinylsiloxy-blocked dimethylsiloxane/methylvinylpolysiloxane copolymers. A mixture of two or more of the foregoing may also be used.

Component (B) is a one end trifunctional, hydrolyzable methylpolysiloxane having the general formula (1):

[Chem. 6]

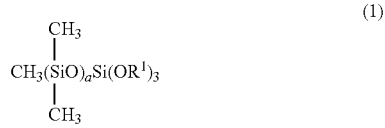

$$CH_3(SiO)_aSi(OR^1)_3 \quad (1)$$

with $CH_3$ groups on the central Si.

wherein $R^1$ is a $C_1$-$C_6$ alkyl group such as methyl, ethyl, propyl, butyl or hexyl, and a is a positive number of 5 to 100.

In the one end trifunctional, hydrolyzable methylpolysiloxane having formula (1) as component (B), the subscript "a" is in the range of 5 to 100, preferably 10 to 60 for the reason that if "a" is less than 5, the composition shows noticeable oil bleeding and loses reliability, and if "a" is more than 100, wettability is insufficient.

The amount of the one end trifunctional, hydrolyzable methylpolysiloxane added is in the range of 10 to 150 parts by weight, preferably 20 to 140 parts by weight per 100 parts by weight of component (A) for the reason that if the amount is less than 10 parts by weight, sufficient wettability is not exerted, and if the amount exceeds 150 parts by weight, oil bleeding becomes noticeable and reliability becomes poor.

Component (C) is a heat-conductive filler having a thermal conductivity of at least 10 W/m·° C.

As the heat-conductive filler or component (C), a filler having a thermal conductivity of at least 10 W/m·° C., preferably at least 15 W/m·° C. is used. The reason is that if the thermal conductivity of the filler is less than 10 W/m·° C., the heat-conductive silicone composition itself has a low thermal conductivity. Examples of the heat-conductive filler include aluminum powder, copper powder, silver powder, iron powder, nickel powder, gold powder, tin powder, metallic silicon powder, aluminum nitride powder, boron nitride powder, alumina powder, diamond powder, carbon powder, indium powder, gallium powder, and zinc oxide powder. Any fillers may be used as long as the thermal conductivity is at least 10 W/m·° C. The fillers may be used alone or in admixture of two or more.

Component (C) preferably has an average particle size in the range of 0.1 to 100 μm, more preferably 0.1 to 90 μm. The reason is that if the average particle size is less than 0.1 μm, the resulting composition may not become greasy and may become less extensible, and if the average particle size exceeds 100 μm, the thermal grease may increase its thermal resistance, resulting in poor performance. As used herein, the average particle size is a volume-average particle size as measured on volume basis by Microtrac MT3300EX (Nikkiso Co., Ltd.).

Component (C) may have any shape including irregular and spherical shapes.

The amount of component (C) loaded is in the range of 500 to 3,000 parts by weight, preferably in the range of 500 to 2,800 parts by weight, and more preferably in the range of 500 to 2,500 parts by weight per 100 parts by weight of components (A) and (B) combined. The reason is that if the amount of component (C) is less than 500 parts by weight, the composition has a low thermal conductivity, and if the amount exceeds 3,000 parts by weight, the composition builds up its viscosity and thus loses extensibility.

Component (D) is an organohydrogenpolysiloxane which must have at least two, preferably 2 to 30, more preferably 2 to 20 silicon-bonded hydrogen atoms (i.e., Si—H groups) in a molecule for ensuring that the composition forms a network structure through crosslinking. The Si—H groups may be present at an end of the molecular chain and/or in the middle of the molecular chain.

The remaining silicon-bonded organic groups other than the Si—H group are preferably substituted or unsubstituted $C_1$-$C_{12}$, more preferably $C_1$-$C_6$, aliphatic unsaturation-free, monovalent hydrocarbon groups. Specific examples include alkyl groups such as methyl, ethyl, propyl, butyl, hexyl, and dodecyl, aryl groups such as phenyl, aralkyl groups such as 2-phenylethyl and 2-phenylpropyl, halo-substituted hydrocarbon groups such as chloromethyl and 3,3,3-trifluoropropyl, and epoxy-substituted hydrocarbon groups such as 2-glycidoxyethyl, 3-glycidoxypropyl, and 4-glycidoxybutyl.

The organohydrogenpolysiloxane having Si—H groups may be linear, branched or cyclic, or a mixture thereof. The number of silicon atoms in the organohydrogenpolysiloxane is preferably 10 to 250, and more preferably 10 to 200.

The organohydrogenpolysiloxanes may be used alone or in combination of two or more.

Examples of component (D) include, but are not limited to, copolymers consisting of $(CH_3)_2HSiO_{1/2}$ units and $(CH_3)_2SiO$ units, copolymers consisting of $(CH_3)_2HSiO_{1/2}$ units, $(CH_3)_3SiO_{1/2}$ units and $(CH_3)_2SiO$ units, copolymers consisting of $(CH_3)_3SiO_{1/2}$ units, $(CH_3)_2SiO$ units and $(CH_3)HSiO$ units, copolymers consisting of $(CH_3)_2HSiO_{1/2}$ units, $(CH_3)_3SiO_{1/2}$ units, $(CH_3)_2SiO$ units and $(CH_3)HSiO$ units, copolymers consisting of $(CH_3)_3SiO_{1/2}$ units and $(CH_3)HSiO$ units, copolymers consisting of $(CH_3)_2HSiO_{1/2}$ units, $(CH_3)_2SiO$ units and $(CH_3)HSiO$ units, copolymers consisting of $(CH_3)_3SiO_{1/2}$ units, $(CH_3)_2HSiO_{1/2}$ units and $(CH_3)HSiO$ units, cyclic copolymers consisting of $(CH_3)HSiO$ units, and cyclic copolymers consisting of $(CH_3)HSiO$ units and $(CH_3)_2SiO$ units.

Component (D) is included in such an amount that [the number of Si—H groups in component (D)]/[the number of alkenyl groups in component (A)] is in the range of 0.5 to 1.5, preferably in the range of 0.7 to 1.3 for the reason that if the quotient is less than 0.5, the composition does not become fully network, allowing for grease pump-out, and if the quotient exceeds 1.5, the crosslinking density becomes too high, allowing for peeling during a reliability test.

Component (E) is a catalyst selected from the group consisting of platinum and platinum compounds, which promotes addition reaction between alkenyl groups in component (A) and Si—H groups in component (D). Examples of component (E) include elemental platinum, chloroplatinic acid, platinum-olefin complexes, platinum-alcohol complexes, and platinum coordination compounds.

The amount of component (E) blended is in the range of 0.1 to 500 ppm, preferably 0.1 to 400 ppm of platinum atom, based on the weight of component (A) for the reason that if the amount is less than 0.1 ppm, no catalytic effect is exerted, and an amount in excess of 500 ppm is uneconomical, with no further effect being achieved.

Component (F) is a benzotriazole derivative having the general formula (2):

[Chem. 7]

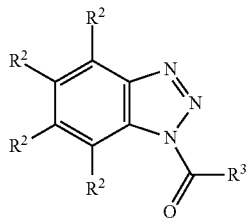

(2)

wherein $R^2$ is hydrogen or a $C_1$-$C_6$ monovalent hydrocarbon group and $R^3$ is a monovalent organic group. Component (F) interacts with the catalyst as component (E) to prevent the cured heat-conductive silicone composition from increasing its hardness during high-temperature aging.

In formula (2), $R^2$ is hydrogen or a $C_1$-$C_6$ monovalent hydrocarbon group. Examples of the $C_1$-$C_6$ monovalent hydrocarbon group include alkyl groups such as methyl, ethyl, propyl, isopropyl, butyl, isobutyl, tert-butyl, pentyl, neopentyl, hexyl, and cyclohexyl, and substituted form of the foregoing groups in which some or all hydrogen atoms are substituted by halogen atoms (e.g., fluorine, bromine, and chlorine), cyano or the like, such as chloromethyl, chloropropyl, bromoethyl, trifluoropropyl, and cyanoethyl. From the aspect of synthesis, $R^2$ is preferably hydrogen or methyl.

$R^3$ is selected from monovalent organic groups including $C_1$-$C_{10}$ monovalent hydrocarbon groups, examples of which include alkyl groups such as methyl, ethyl, propyl, isopropyl, butyl, isobutyl, tert-butyl, pentyl, neopentyl, hexyl, and cyclohexyl, aryl groups such as phenyl, tolyl, xylyl, and naphthyl, and aralkyl groups such as benzyl, phenylethyl, and phenylpropyl. Also included are groups having the following formula.

[Chem. 8]

$$*-\underset{H}{\overset{}{N}}-R^4$$

Herein $R^4$ is a $C_1$-$C_{15}$, specifically $C_1$-$C_{10}$ monovalent hydrocarbon groups such as alkyl, or —$(CH_2)_b$—$Si(OR^5)_3$ wherein $R^5$ is a $C_1$-$C_4$, specifically $C_1$-$C_3$ alkyl, or a group $SiR^6{}_3$ (wherein $R^6$ is a $C_1$-$C_4$, specifically $C_1$-$C_3$ alkyl), and b is an integer of 1 to 6, specifically 1 to 3, and * designates a valence bond.

Examples of the monovalent hydrocarbon group of $R^4$ include alkyl groups such as methyl, ethyl, propyl, butyl, hexyl, and dodecyl, aryl groups such as phenyl, and aralkyl groups such as 2-phenylethyl and 2-phenylpropyl. Examples of the alkyl group of $R^5$ and $R^6$ include $C_1$-$C_4$, specifically $C_1$-$C_3$ alkyl groups such as methyl, ethyl, and propyl.

Specific examples of the benzotriazole derivative are given below.

[Chem. 9]

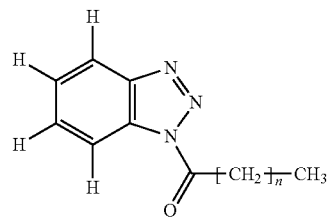

Herein n is an integer of 0 to 6.

[Chem. 10]

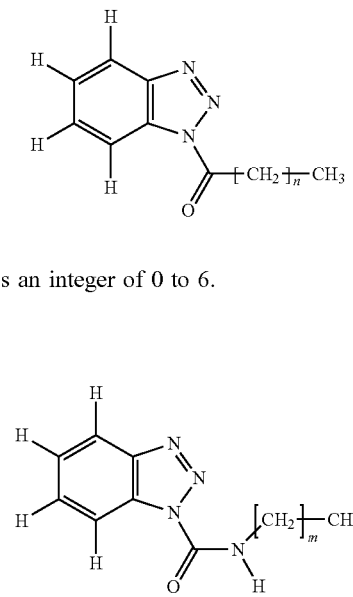

Herein m is an integer of 1 to 6.

[Chem. 11]

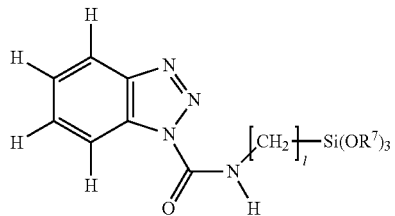

Herein l is an integer of 1 to 6, $R^7$ is a $C_1$-$C_3$ alkyl group or trialkylsilyl group in which each alkyl moiety has 1 to 3 carbon atoms.

Of these, the following compounds are most preferred.

[Chem. 12]

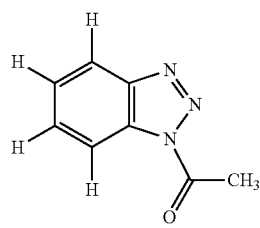

[Chem. 13]

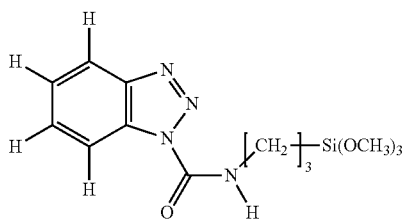

-continued

[Chem. 14]

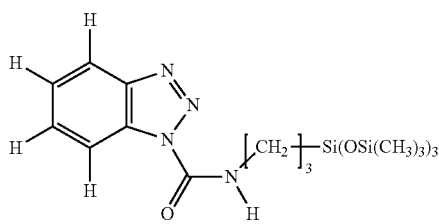

Component (F) is blended in an amount of 2 to 1,000 moles, preferably 2 to 800 moles, and more preferably 2 to 500 moles per mole of platinum atom in component (E). If the amount is less than 2 moles, a hardness increase cannot be fully prevented. If the amount exceeds 1,000 moles, the cure speed on heating is decelerated.

The inventive heat-conductive silicone composition may further include an inhibitor as component (G) for suppressing the catalytic activity of component (E). The inhibitor as component (G) functions to retard the progress of hydrosilylation reaction at room temperature and to extend the shelf life or pot life of the composition. The inhibitor used herein may be selected from well-known inhibitors such as acetylene compounds, various nitrogen compounds, organophosphorus compounds, oxime compounds, and organic chlorine compounds.

The amount of component (G) blended is preferably in the range of 0.1 to 5% by weight, more preferably 0.1 to 4% by weight based on component (A) for the reason that if the amount is less than 0.1 wt %, no sufficient shelf life or pot life may be available, and if the amount is more than 5 wt %, the cure speed may be decelerated. Component (G) may be diluted with a solvent such as toluene, prior to use, in order to facilitate its dispersion in the heat-conductive silicone composition.

Also, besides the above-mentioned components (A) to (G), an antioxidant for preventing degradation and other additives may be compounded in the inventive heat-conductive silicone composition, if necessary.

The inventive heat-conductive silicone composition may be prepared by mixing components (A) to (G) on a mixer such as Trimix, Twinmix, and Planetary Mixer (all registered trademarks of mixers manufactured by Inoue Mfg., Inc.), Ultra Mixer (registered trademark of a mixer manufactured by Mizuho Industrial Co., Ltd.), or Hivis Disper Mix (registered trademark of a mixer manufactured by Tokushu Kika Kogyo Co., Ltd.).

The resulting heat-conductive silicone composition preferably has an absolute viscosity at 25° C. of 5 to 2,000 Pa·s, specifically 10 to 900 Pa·s as measured by a rotational viscometer.

The heat-conductive silicone composition may be cured by heating at 80 to 180° C., specifically 90 to 170° C. for 30 to 150 minutes, specifically 40 to 140 minutes.

The inventive heat-conductive silicone composition suppresses deceleration of cure speed, and a cured product of the composition experiences a minimal hardness increase during high-temperature aging. Therefore the composition is advantageously used as a heat-conductive material applicable to cooling members for heat-generating parts such as semiconductor chips.

Examples

The invention is described below in detail with reference to Examples and Comparative Examples, but not limited thereto.

Tests for demonstrating the effects of the invention were carried out as follows.

[Viscosity]

The absolute viscosity of a heat-conductive silicone composition was measured at 25° C. by a viscometer type PC-1TL (Malcom Co., Ltd.).

[Thermal Conductivity]

A heat-conductive silicone composition was cast into a mold of 3 cm deep, covered with food wrap, and measured for thermal conductivity by a meter Model QTM-500 (Kyoto Electronics Manufacturing Co., Ltd.).

[Evaluation of Cure Speed]

A heat-conductive silicone composition was applied to a thickness of 2 mm between two parallel plates having a diameter of 2.5 cm. The rubber-plate sandwich was heated according to a program scheduled to heat from 25° C. at 5° C./min and then keep at 150° C. for 90 minutes while the composition was measured for a storage modulus G' and a loss modulus G". The point of time when the value of storage modulus G' exceeds that of loss modulus G" is referred to as a crossover time, which is an index of cure speed. The measurement was carried out by a viscoelasticity analyzer type ARES-G2 (TA Instruments).

[Evaluation of Hardness Increase]

A sheet-shaped sample was prepared by casting a heat-conductive silicone composition into a mold of 6 cm×6 cm×6 mm and heating at 150° C. for 90 minutes. A stack of two sheets was measured for hardness by an Asker C hardness tester, the hardness being referred to as initial hardness. The stack was then aged at 125° C. for 500 hours before hardness was measured.

[Measurement of Thermal Resistance]

A test piece for thermal resistance measurement was prepared by sandwiching a heat-conductive silicone composition between a Si chip of 15 mm×15 mm×1 mm thick and a Ni plate of 15 mm×15 mm×1 mm thick, so as to give a thickness of 80 μm, compressing the assembly under 0.7 MPa for 15 minutes, and placing the assembly as loaded in an oven at 150° C. for 90 minutes where the heat-conductive silicone composition was heat cured. The test piece was measured for thermal resistance. Thereafter, the test piece was subjected to a thermal cycling test (−55° C.⇔125° C.) over 500 cycles to observe any change in thermal resistance. Notably, thermal resistance was measured by NanoFlash (LFA447 by NETZSCH).

There were furnished the following components, from which heat-conductive silicone compositions within the scope of the invention were prepared.

Component (A)

A-1: dimethylpolysiloxane blocked at both ends with dimethylvinylsilyl and having a kinematic viscosity of 600 mm²/s at 25° C.

Component (B)

B-1: dimethylpolysiloxane blocked at one end with trialkoxysilyl, represented by the following formula:

[Chem. 15]

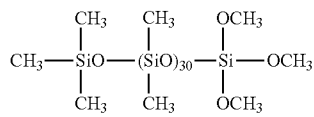

Component (C)

C-1 or C-2 was obtained by mixing the following aluminum powder or alumina powder with zinc oxide powder in the weight ratio shown in Table 1 on a 5-liter Planetary Mixer (Inoue Mfg., Inc.) at room temperature for 15 minutes.

Aluminum powder with an average particle size of 10 μm (thermal conductivity 236 W/m·° C.)

Alumina powder with an average particle size of 6 μm (thermal conductivity 27 W/m·° C.)

Zinc oxide powder with an average particle size of 0.6 μm (thermal conductivity 25 W/m·° C.)

TABLE 1

| Component (C) | Aluminum powder with average particle size 10 μm (g) | Alumina powder with average particle size 6 μm (g) | Zinc oxide powder with average particle size 0.6 μm (g) |
|---|---|---|---|
| C-1 | 950 | — | 230 |
| C-2 | — | 1,120 | 320 |

Component (D)

Organohydrogenpolysiloxanes represented by the following formulae:

[Chem. 16]

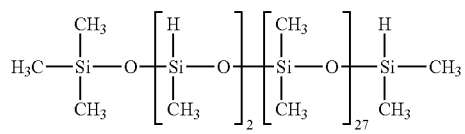

D1

[Chem. 17]

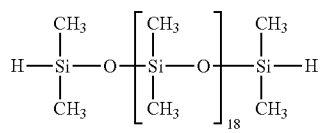

D2

Component (E)

E-1: Solution of platinum-divinyltetramethyldisiloxane complex in A-1, containing 1 wt % of platinum atom Component (F)

Benzotriazole derivatives or benzotriazole represented by the following formulae:

[Chem. 18]

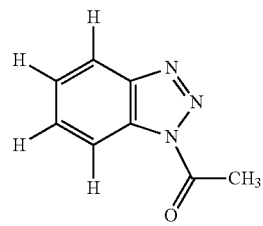

F-1

[Chem. 19]

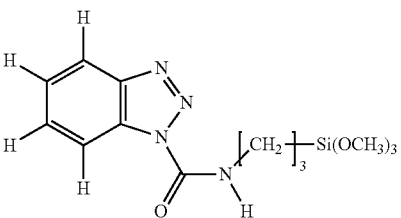

F-2

[Chem. 20]

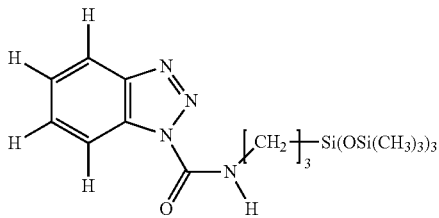

F-3

F-4: benzotriazole (Comparison)

Component (G)

G-1: 1-ethynyl-1-cyclohexanol

Heat-conductive silicone compositions of Examples 1 to 6 and Comparative Examples 1 to 5 were obtained by mixing components (A) to (G) as follows.

Specifically, a 5-liter Planetary Mixer (Inoue Mfg., Inc.) was charged with 100 parts by weight of component (A), components (B) and (C) were added thereto in the amounts shown in Tables 2 and 3, and the contents were mixed at 170° C. for 1 hour. After the mixture was cooled to room temperature, components (D), (E), (F) and (G) were added thereto in the amounts shown in Tables 2 and 3 and mixed until uniform.

TABLE 2

| | Example | | | | | |
|---|---|---|---|---|---|---|
| Formulation | 1 | 2 | 3 | 4 | 5 | 6 |
| A-1 (pbw) | 100 | 100 | 100 | 100 | 100 | 100 |
| B-1 (pbw) | 100 | 100 | 100 | 100 | 100 | 140 |
| C-1 (pbw) | 2,550 | 2,550 | 1,834 | 2,550 | 2,550 | |
| C-2 (pbw) | | | | | | 5,100 |
| Component (C)/total of components (A) and (B) = 100 (pbw) | 1,275 | 1,275 | 917 | 1,275 | 1,275 | 2,126 |
| D-1 (pbw) | 10.3 | 10.3 | 10.3 | 10.3 | 10.3 | 17.1 |
| D-2 (pbw) | 4.4 | 4.4 | 4.4 | 4.4 | 4.4 | 0 |
| [Si—H in component (D)]/[Si—Vi in component (A)] (number/number) | 1.0 | 1.0 | 1.0 | 1.0 | 1.0 | 1.0 |
| E-1 (pbw) | 0.36 | 0.36 | 0.36 | 3.0 | 0.10 | 0.72 |
| F-1 (pbw) | 0.12 | | | | | |
| F-2 (pbw) | | 0.12 | | 0.12 | 0.60 | 0.24 |

TABLE 2-continued

| | Example | | | | | |
|---|---|---|---|---|---|---|
| | 1 | 2 | 3 | 4 | 5 | 6 |
| F-3 (pbw) | | | 0.12 | | | |
| F-4 (Comparison) (pbw) | | | | | | |
| [Moles of component (F)]/ [moles of platinum atom in component (E)] | 40 | 20 | 13 | 2.4 | 360 | 20 |
| G-1 (pbw) | 0.23 | 0.23 | 0.23 | 0.23 | 0.12 | 0.23 |
| Test results | | | | | | |
| Viscosity (Pa · s) | 221 | 236 | 241 | 218 | 233 | 367 |
| Thermal conductivity (W/m · ° C.) | 5.5 | 5.6 | 4.3 | 5.4 | 5.5 | 6.3 |
| Crossover time (sec) | 860 | 800 | 760 | 650 | 920 | 790 |
| Initial hardness (Asker C) | 5 | 5 | 6 | 9 | 5 | 16 |
| Hardness after aging (Asker C) | 9 | 11 | 12 | 18 | 7 | 21 |
| Thermal resistance (mm$^2$ · K/W) | 5.4 | 5.2 | 7.1 | 5.3 | 6.1 | 4.9 |
| Thermal resistance after thermal cycling (mm$^2$ · K/W) | 5.7 | 5.6 | 7.7 | 5.8 | 6.4 | 5.7 |

TABLE 3

| | Comparative Example | | | | |
|---|---|---|---|---|---|
| | 1 | 2 | 3 | 4 | 5 |
| Formulation | | | | | |
| A-1 (pbw) | 100 | 100 | 100 | 100 | 100 |
| B-1 (pbw) | 100 | 100 | 100 | 140 | 60 |
| C-1 (pbw) | 2,550 | 2,550 | 2,550 | 7,566 | 780 |
| C-2 (pbw) | | | | | |
| Component (C)/total of components (A) and (B) = 100 (pbw) | 1,275 | 1,275 | 1,275 | 3,153 | 488 |
| D-1 (pbw) | 10.3 | 10.3 | 10.3 | 17.1 | 10.3 |
| D-2 (pbw) | 4.4 | 4.4 | 4.4 | 0 | 4.4 |
| [Si—H in component (D)]/[Si-Vi in component (A)] (number/number) | 1.0 | 1.0 | 1.0 | 1.0 | 1.0 |
| E-1 (pbw) | 0.36 | 0.36 | 0.72 | 0.36 | 0.36 |
| F-1 (pbw) | | | | | |
| F-2 (pbw) | | 6.4 | 0.02 | 0.12 | 0.12 |
| F-3 (pbw) | | | | | |
| F-4 (Comparison) (pbw) | 0.12 | | | | |
| [Moles of component (F)]/ [moles of platinum atom in component (E)] | 54 | 1,070 | 1.1 | 20 | 20 |
| G-1 (pbw) | 0.23 | 0.23 | 0.23 | 0.23 | 0.23 |
| Test results | | | | | |
| Viscosity (Pa · s) | 220 | 212 | 246 | not greasy | 92 |
| Thermal conductivity (W/m · ° C.) | 5.5 | 5.4 | 5.5 | | 2.1 |
| Crossover time (sec) | 1,790 | 2,600 | 530 | | 680 |
| Initial hardness (Asker C) | 15 | 3 | 12 | | 7 |
| Hardness after aging (Asker C) | 19 | 6 | 35 | | 9 |
| Thermal resistance (mm$^2$ · K/W) | 8.6 | 9.6 | 5.1 | | 14.1 |
| Thermal resistance after thermal cycling (mm$^2$ · K/W) | 9.1 | 10.1 | 10.1 | | 14.3 |

The invention claimed is:

1. A heat-conductive silicone composition comprising:

(A) an organopolysiloxane containing at least two alkenyl groups in a molecule and having a kinematic viscosity of 10 to 100,000 mm$^2$/s at 25° C., (B) a hydrolyzable methylpolysiloxane which is trifunctional at one end, having the general formula (1):

[Chem. 1]

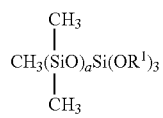

$$CH_3(SiO)_a Si(OR^1)_3$$
(with CH$_3$ substituents on the central Si)

(1)

wherein R$^1$ is a C$_1$-C$_6$ alkyl group and a is a positive number of 5 to 100, in an amount of 10 to 150 parts by weight per 100 parts by weight of component (A), (C) a heat-conductive filler having a thermal conductivity of at least 10 W/m·° C., in an amount of 500 to 3,000 parts by weight per 100 parts by weight of components (A) and (B) combined, (D) an organohydrogenpolysiloxane containing at least two silicon-bonded hydrogen atoms in a molecule, in such an amount that [the number of Si—H groups in component (D)]/[the number of alkenyl groups in component (A)] ranges from 0.5 to 1.5, (E) a catalyst selected from the group consisting of platinum and platinum compounds, in such an amount as to provide 0.1 to 500 ppm of platinum atom based on the weight of component (A), and (F) a benzotriazole derivative having the general formula (2):

[Chem. 2]

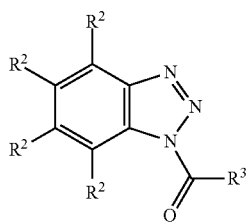

(2)

wherein $R^2$ is hydrogen or a $C_1$-$C_6$ monovalent hydrocarbon group and $R^3$ is a monovalent organic group, in an amount of 2 to 1,000 moles per mole of platinum atom in component (E).

2. The heat-conductive silicone composition of claim 1, further comprising (G) an inhibitor selected from the group consisting of acetylene compounds, nitrogen compounds, organophosphorus compounds, oxime compounds, and organic chlorine compounds, in an amount of 0.1 to 5% by weight based on component (A).

3. The heat-conductive silicone composition of claim 1 wherein $R^3$ in formula (2) is a $C_1$-$C_{10}$ monovalent hydrocarbon group or a group having the following formula:

[Chem. 3]

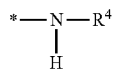

wherein $R^4$ is a $C_1$-$C_{15}$ monovalent hydrocarbon group or —$(CH_2)_b$—$Si(OR^5)_3$ wherein $R^5$ is a $C_1$-$C_4$ alkyl group or a group $SiR^6_3$ wherein $R^6$ is a $C_1$-$C_4$ alkyl group, b is an integer of 1 to 6, and * designates a valence bond.

* * * * *